(12) United States Patent
Craggs et al.

(10) Patent No.: US 8,082,554 B2
(45) Date of Patent: Dec. 20, 2011

(54) EVENT-BASED ACTIVATION AND DEACTIVATION OF SUBSCRIPTION MATCHING

(75) Inventors: Ian Gerald Craggs, Wiltshire (GB); Anthony Alan Garrard, Hants (GB); Ian Robert Harwood, Hampshire (GB); Andrew Ian Hickson, Hants (GB); David Locke, Hampshire (GB); Andrew David Reynolds, Southampton (GB); Andrew James Stanford-Clark, Isle of Wight (GB); Jane Louise Stockdill, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 1054 days.

(21) Appl. No.: 11/947,843

(22) Filed: Nov. 30, 2007

(65) Prior Publication Data

US 2008/0134202 A1 Jun. 5, 2008

(30) Foreign Application Priority Data

Nov. 30, 2006 (GB) .................................. 0623927.1

(51) Int. Cl.
*G06F 13/00* (2006.01)
(52) U.S. Cl. ........................................ 719/318; 719/313
(58) Field of Classification Search .................. 719/313, 719/318
See application file for complete search history.

(56) References Cited

U.S. PATENT DOCUMENTS

| | | |
|---|---|---|
| 6,829,770 B1 | 12/2004 | Hinson et al. |
| 7,559,065 B1 * | 7/2009 | Sosnovsky et al. ........... 719/318 |
| 7,698,276 B2 * | 4/2010 | Seshadri et al. .............. 719/318 |
| 2006/0088014 A1 | 4/2006 | Ganesh |
| 2008/0208953 A1 | 8/2008 | Tian |
| 2008/0256553 A1 * | 10/2008 | Cullen .......................... 719/313 |

OTHER PUBLICATIONS

Wang, et al., "Adaptive Real-Time Publish-Subscribe Messaging for Distributed Monitoring Systems", IEEE International Workshop on Intelligent Data Acquisition and Advanced Computing Systems: Technology and Applications, pp. 412-417 (Ukraine, Sep. 8-10, 2003).
Wang, et al., "Adaptive Real-Time Publish-Subscribe Service Model for Mobile Communications Environments," Proceedings 2003 International Conference on Computer Networks and Mobile Computing (ICCNMC'03).

* cited by examiner

*Primary Examiner* — Andy Ho
(74) *Attorney, Agent, or Firm* — A. Bruce Clay

(57) ABSTRACT

The present invention provides methods, apparatus and computer programs for event-based control of subscription matching in a publish/subscribe communications environment. Activation and/or deactivation events are associated with subscriptions at a publish/subscribe broker and are used to control when a subscription is active. The broker is responsive to temporally-unpredictable events, such as receipt of a published message on a predefined activation topic, to activate subscription matching for messages that are subsequently received or which have been received earlier and retained at the broker. Conventional subscription matching can be avoided for a registered subscription while that subscription is inactive, and subscribers are not required to explicitly and repeatedly subscribe and unsubscribe.

16 Claims, 5 Drawing Sheets

EVENT-BASED ACTIVATION AND DEACTIVATION OF SUBSCRIPTION MATCHING

BACKGROUND OF THE INVENTION

The present invention relates to communications within a data processing network, and in particular to implementations of the publish/subscribe communications paradigm Within a messaging network, messages may be delivered from one data processing system to another via one or more "message brokers" that provide routing and, in many cases, formatting and other services. The brokers are typically located at communication hubs within the network although broker functions may be implemented at various points within a distributed broker network.

Many message brokers support a publish/subscribe communication paradigm. This involves publishers sending communications that can be received by a set of subscribers who have registered their interest in receiving communications of particular types, typically without the publisher needing to know which subscribers are interested in which communications. Publish/subscribe allows subscribers to receive the latest information in an area of interest (for example, stock prices or events such as news flashes or store special offers) without having to repeatedly request that information from each of the publishers.

A typical publish/subscribe environment has a number of publisher applications sending messages via a broker to a potentially large number of subscriber applications located on remote computers across the network. The subscribers register with a broker and identify the message types they wish to receive. The subscription information is stored at the broker. In many publish/subscribe implementations, subscribers specify one or more topic names which represent the types of messages they wish to receive. When publishers send their messages to the broker, the publishers assign topic names to the messages and the broker uses a matching engine to compare the topics of received messages with stored subscription information for the registered subscribers. This comparison determines to which subscribers the message should be forwarded. Topics are often specified hierarchically, for example using a character string format "root/topicLevel1/topicLevel2", to enable topics specified within received messages to be compared with subscriptions using a matching algorithm that iteratively steps through the topic hierarchy.

Another known publish/subscribe environment implements a publish/subscribe matching engine on the same data processing system that has a subscriber application. Publishers send publications (messages) to this system and the publish/subscribe matching engine determines which messages are of interest to the local subscriber application. In the context of the present invention, the term "publish/subscribe broker" is intended to include a publish/subscribe matching engine implemented either at an intermediate network node or at the subscriber's data processing system.

Some publish/subscribe environments include a combination of subscribers that are local to a broker and subscribers that are remote from the broker.

Although subscription matching often involves checking topic fields within message headers, the matching may additionally or alternatively involve checking other message header fields or checking message content and filtering messages based on the additional information. For example, a message broker implementing the Java™ Message Service (JMS) typically allows filtering based on message properties other than message content or 'payload'. A message broker may perform additional functions, such as formatting or otherwise processing received messages before forwarding them to subscribers. (Java and all Java-based trademarks are trademarks of Sun Microsystems, Inc.).

The publish/subscribe paradigm is an efficient way of disseminating information to multiple users, and is especially useful for environments in which the set of publishers and/or subscribers can change over time and where the number of publishers and/or subscribers can be large. Although some subscriptions are 'non-durable' (i.e. remain active only while a subscribing application is connected to the broker), many subscriptions are 'durable' and remain active until the subscribing application explicitly unsubscribes. When a 'durable' subscriber no longer wishes to receive messages, the subscriber can unsubscribe from the broker (or unsubscribe from a particular topic or set of topics).

Although this ability to subscribe and unsubscribe leaves the subscriber in control of which messages they receive, the subscriber has to initiate each subscribe and unsubscribe operation. Subscribers typically require a confirmation reply for each subscribe or unsubscribe operation. Subscription, unsubscription and confirmation messages result in network communication overhead and may result in latency in the performance of each subscribe and unsubscribe operation at the broker. The more frequent the subscribe and unsubscribe operations, the more likely it is that the inherent latency on subscribe operations will cause the subscriber to miss a desired message. In a communications environment that relies on low bandwidth or unreliable connections between a subscriber and a broker, connection problems could also result in a significant delay before the subscriber starts receiving desired messages.

The latency on unsubscribe operations may result in undesirable communications and processing overhead for the subscriber since the subscriber may continue receiving unwanted messages over a slow or expensive network link until the unsubscribe operation can be completed. In the case of a distributed network of brokers that can each subscribe to other brokers, there is potential for a great deal of unwanted network traffic. In the case of durable subscriptions, where the broker queues messages on behalf of an unconnected subscriber, unwanted messages may build up in broker storage space while the subscriber remains unconnected. Queued messages may use too much of the broker's storage space and may result in a surge in network traffic the next time the subscriber connects, causing all of the stored messages to be downloaded to the subscriber. For a mobile subscriber who relies on expensive or unreliable network links and who may not connect for considerable periods of time, the volume of unwanted messages may be large each time the subscriber does connect.

BRIEF SUMMARY OF THE INVENTION

The present invention may be implemented as a method of managing subscription matching within a publish/subscribe communications network. A subscription initiated on behalf of a first subscriber is a stored at a publish/subscribe broker. The subscription includes at least one temporally unpredictable event to be used in controlling the performance of subscription matching. Events are monitored at the publish/subscribe broker to detect occurrence of the temporally unpredictable event. The state of subscription matching performed on behalf of the first subscriber is altered in response to occurrence of the event.

The invention may also be implemented as a data processing apparatus for managing subscription matching within a publish/subscribe communications network. The apparatus includes a repository for storing a subscription on behalf of at least one subscriber. The stored subscription includes at least one temporally unpredictable event. The apparatus further includes a publish/subscribe broker including a matching engine for performing subscription matching and an event monitor for identifying an occurrence of said temporally unpredictable event. The publish/subscribe broker responds to the occurrence of the event by altering the state of subscription matching performed on behalf of the subscriber.

The invention may also be implemented as a computer program product for managing subscription matching within a publish/subscribe communication network. The computer program product includes a computer usable media embodying computer usable program code. Computer usable program code is configured to store a subscription a publish/subscribe broker for a first subscriber. The stored subscription includes at least one temporally unpredictable event for controlling the performance of subscription matching. The computer program product also includes computer usable program code configured to monitor events at the publish/subscribe broker to identify an occurrence of the event. The publish/subscribe broker responds to occurrence of the event to alter the state of subscription matching performed on behalf the subscriber.

DETAILED DESCRIPTION OF THE INVENTION

Figure 1:
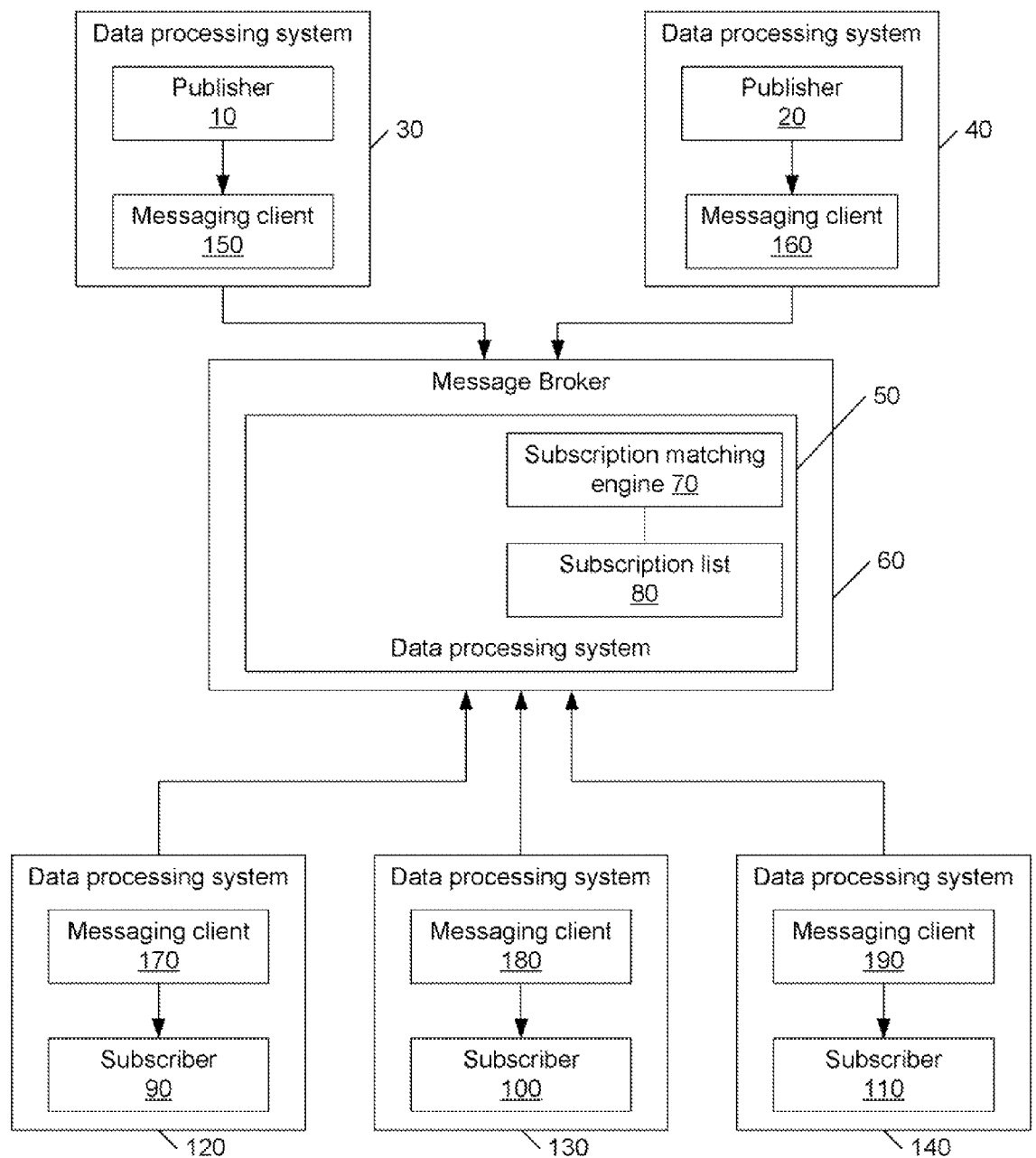
FIG. 1 is a schematic representation of a known publish/subscribe messaging network including publisher and subscriber applications and an intermediate publish/subscribe broker for managing the flow of published messages to interested subscribers.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

A number of embodiments of the present invention are described below. As with the illustrative examples of topics and activation/deactivation events described above, these embodiments are described as illustrative examples only. The invention is not limited to the described embodiments.

In particular, the embodiments described below include methods, apparatus and computer programs for event-based control of subscription matching in a publish/subscribe communications environment. Activation and/or deactivation events are associated with subscriptions and are used to control when a subscription is active.

FIG. 1 shows a simple publish/subscribe messaging network of a type in which the present invention may be implemented. Such networks are known in the art. A set of publishers 10,20 running on respective data processing systems 30,40 are able to publish messages that can be received by multiple subscribers 90,100,110, by the publishers sending messages to an intermediate publish/subscribe message broker 50. The publishers and subscribers are not directly connected and do not need each other's address information. Instead, the publishers send messages to the broker 50, including message type information such as message topics within their published messages. In this example, the publishers 10,20 and subscribers 90,100,110 are application programs that rely on message transfer functions of underlying messaging clients 150,160,170,180,190 that store network addresses and other communication information for the broker 50.

In this example, the message broker is implemented on a data processing system 60 that is separate from the publisher systems 30,40 and separate from subscriber's systems 120, 130,140. The message broker comprises a subscription matching engine 70 and an associated stored subscription list 80. Subscribers register with the broker 50 and indicate their interest in particular types of messages by specifying a particular message topic or topics. The subscribers' message requirements are stored at the broker. In a preferred embodiment the broker merely stores names of subscriber systems and their subscription message requirements while network and communications information is stored at the subscriber's system and used when the subscriber initiates a connection to the broker. In an alternate embodiment, a broker also stores network addresses and protocol requirements for individual subscriber systems and can initiate a connection;

The subscription matching engine 70 at the broker 50 compares subsequently received messages with stored subscriptions to determine which received messages match the requirements of which subscribers, and the broker forwards the messages to the interested subscribers. Although only a small number of publishers and subscribers are shown in FIG. 1, there may be many publishers and many subscribers within the network and the publish/subscribe broker may be part of a distributed broker network.

In many cases a publish/subscribe broker will be implemented on a high capacity, high performance, network-connected data processing system since such systems can maintain high performance message throughput for a large number of publishers and subscribers. The publish/subscribe broker may be a component of an edge server (i.e. the broker may be one of a set of Web server or application server components) or a network gateway device. However, 'micro broker' solutions that have a small code footprint have been developed in recent years and have been used for example in remote telemetry applications, so it is now true to say that the publishers, subscribers and publish/subscribe broker may all be implemented on any one of a wide range of data processing systems and devices. The invention can therefore be implemented in networks that include wireless PDAs and automated sensor devices as well as networks that include complex and high performance computer systems.

As noted above, the invention is applicable to publish/subscribe communications environments that rely on a centrally located broker (as shown in FIG. 1) or a distributed broker network. The invention provides particular advantages for a publish/subscribe broker that manages subscriptions for a plurality of subscribers, but the invention is also applicable in environments in which the publish/subscribe broker comprises publish/subscribe matching engine functionality that is replicated at each subscriber system.

The invention provides enhanced event-based management of subscription matching in a publish/subscribe communications environment. In particular, embodiments of the invention enable subscribers to define temporally unpredictable activation and deactivation events, such that subscription matching can be switched on and off by a publish/subscribe broker without requiring the subscribers to repeatedly issue 'subscribe' and 'unsubscribe' requests.

Figure 2:
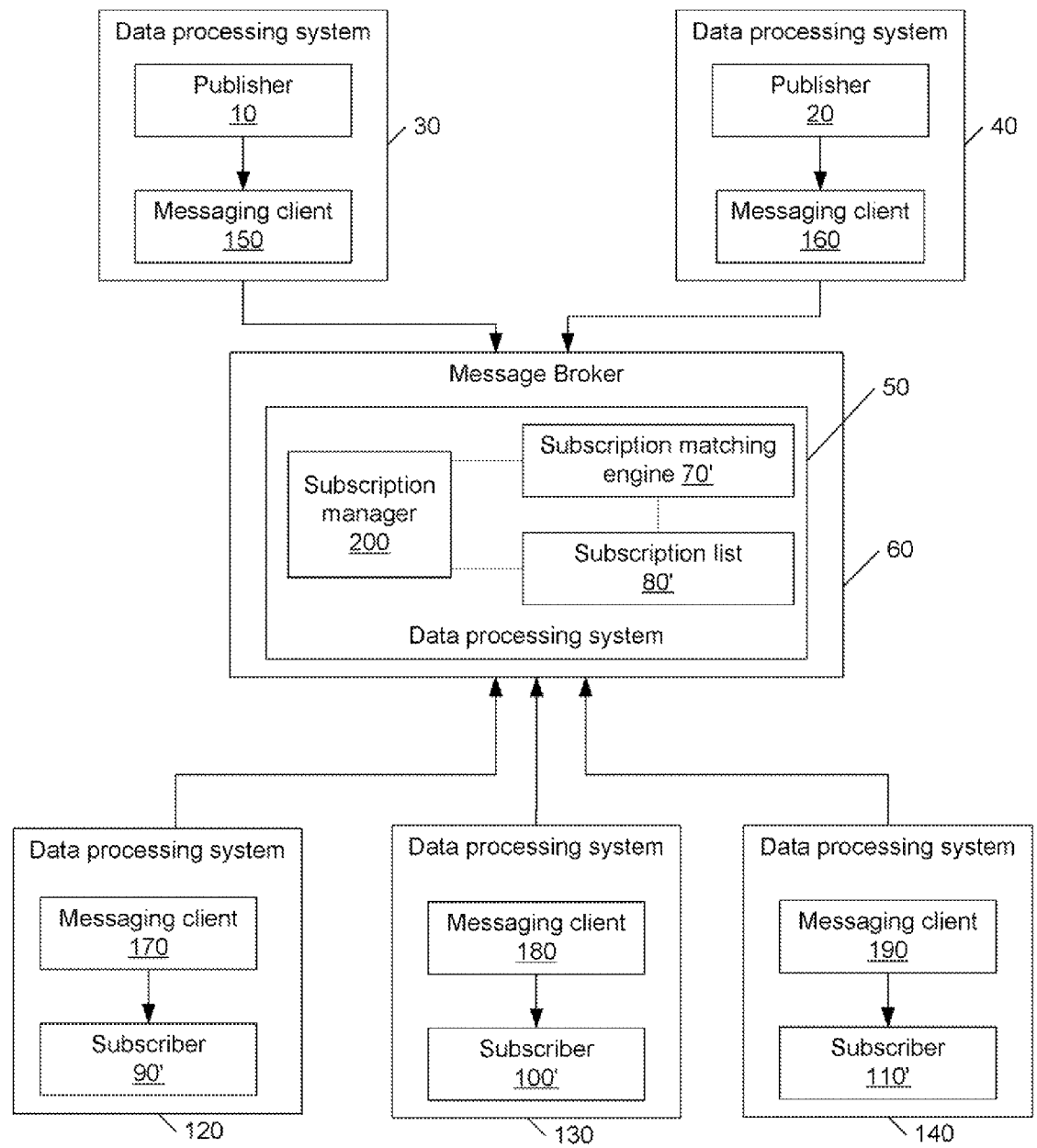
FIG. 2 is a schematic representation of a publish/subscribe network in which an embodiment of the present invention is implemented.

An implementation of the present invention is described in detail below with reference to FIGS. 2 to 4. In a publish/subscribe network that includes the example implementation, the publishers 10,20 may be entirely conventional. For example, a first set of publisher application programs may be JMS messaging clients that are each running on one of a heterogeneous plurality of data processing systems. The JMS clients publish messages that include the message contents and a message header. A topic field within the message header includes a topic string that can be compared with topic strings within subscriptions to identify subscribers that wish to receive messages of this type. The topic string within the topic field of a published message has the format 'Root/TopicLevel1/TopicLevel2' although many different formats can be used and different numbers of levels may be specified within the topic hierarchy.

Furthermore, the subscribers 90', 100', 110' of the present embodiment require very little modification compared with conventional subscribers. Thus, a set of subscriber applications may comprise JMS messaging clients running on a separate data processing systems 120,130,140 (e.g. a laptop computer, a personal digital assistant or other device). As in conventional publish/subscribe solutions, the subscribers generate a subscription request and send the request to a publish/subscribe broker 50. Generating a subscription request includes creating a subscription definition by specifying a topic string representing the message types that the subscriber wishes to receive.

However, subscriber applications 90',100',110' implementing the present embodiment can also specify one or more activation events or deactivation events. In particular, unlike conventional solutions, subscribers are able to specify temporally-unpredictable activation and deactivation events instead of being limited to predefined on/off times.

Activation event and deactivation event clauses are similar to known subscription filters, comprising a topic whose content is to be filtered and a filter expression (expressed as a predicate) that is based on properties or contents of the message. However, the activation and deactivation event clauses are evaluated by the publish/subscribe broker at an earlier stage than conventional subscription filters, and are used to determine whether subscription matching should be activated/deactivated. This is explained in more detail below.

An example format for an enhanced subscription definition that includes activation and deactivation event clauses is:

subscribe boiler/pressure
activateOn topic: boiler/1/tem filter:"temp≧99"
activateOff topic:boiler/1/temp filter:"temp<99"

where 'boiler/1/pressure' is the topic that the subscriber wishes to subscribe to. The subscriber wishes the subscription to be inactive when boiler temperatures are less than 99° C. and activated when the temperature reaches or exceeds 99° C. The activation event is specified to be receipt of a message on topic 'boiler/1/temp' with a value matching the specified temperature value filter.

The specified events can then be used by the publish/subscribe broker 50' to control the lifecycle of a subscription, automatically switching subscription matching on and off in response to the occurrence of the specified events. This event-driven switching of a subscription between active and inactive states is described in more detail below.

The publish/subscribe broker 50' according to the present embodiment includes a subscription matching engine 70' associated with a stored subscription list 80' and an additional subscription manager component 200. The subscription manager 200 is arranged to intercept and interpret received messages to identify activation and deactivation events. Operations of the subscription manager 200 are described in more detail below with reference to FIGS. 3 and 4.

Figure 3:
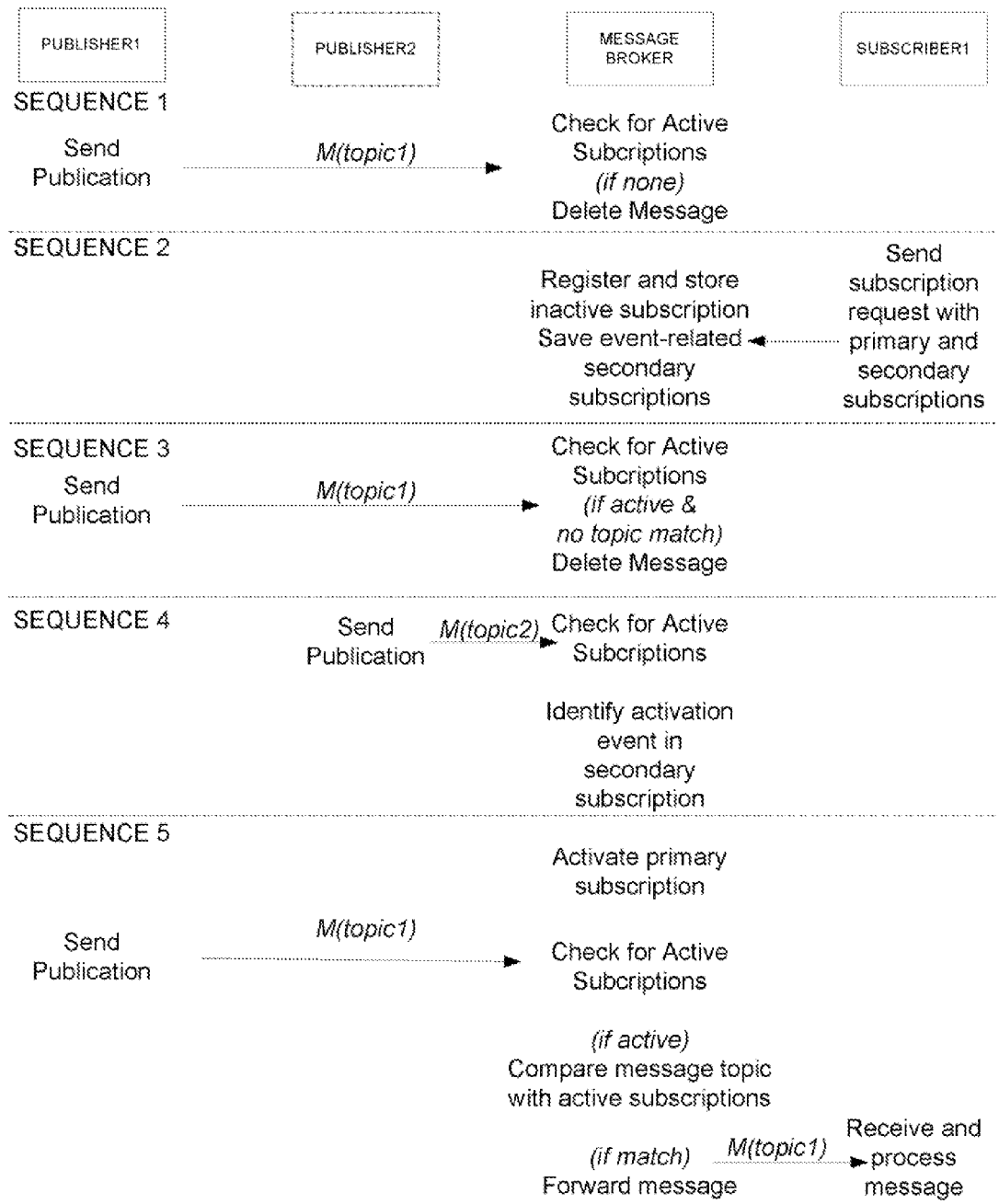
FIG. 3 is a schematic representation of certain sequences of operations performed within a publish/subscribe network according to an embodiment of the invention.

FIG. 3 shows sequences of operations 1, 2, 3, 4 and 5. The sequences are merely illustrative examples and are temporally independent. That is, the messages may be sent and subscription events may occur at irregular and unpredictable times. In particular, the timing of sequence 4 is not predefined by the subscription request of sequence 2. Nevertheless, the example sequences 1, 2, 3, 4 and 5 are described as if occurring in numerical order.

Referring to sequence 1, a first publisher PUBLISHER1 may already be publishing messages with a topic identifier (topic1) prior to any subscriber registering with the broker. On receipt of these messages at the broker, the subscription manager 200 looks for any active subscriptions to the topic identifier. In the absence of registered subscribers, there can be no active subscriptions and the published message is deleted.

Some message brokers implement a 'retain' policy, such as to retain the last message published on each topic in storage (e.g. cache memory) at the broker. This can be useful for new subscribers who wish to receive the latest message on their topics of interest without having to wait for a new message to be sent by the respective publisher(s). For simplicity, retain policies have been disregarded in this discussion of FIG. 3 but are referred to later in this specification.

Referring to sequence 2, a subscriber SUBSCRIBER1 generates a subscription definition (as described above) and sends this as a subscription request to the message broker 50'. The subscription request includes address information for SUBSCRIBER1. The subscription definition itself includes a topic name and other filter information to indicate a set of criteria for messages that SUBSCRIBER1 wishes to receive. In addition, the subscription definition includes definitions of at least one of an activation event and a deactivation event, and may include an initial active/inactive status flag. In sequence 2, the initial status is inactive. In this example, the activation event is defined as receipt by the broker of a published message on a different topic (topic2). The deactivation event may be receipt of a message on a further topic (topic3), or the deactivation event may be a message on topic2 that has different message parameters. The description below assumes the existence of a pair of secondary subscriptions on topic2 and topic3 to handle activation and deactivation events, but other embodiments of the invention are equally possible.

The message broker 50' receives the subscription request and registers the subscriber, saving the subscription information in the subscription list 80' with a status flag indicating that the subscription is currently inactive. In addition to saving the inactive subscription on topic1 (which is the explicitly-requested or 'primary' subscription for SUBSCRIBER1), the subscription manager also saves two active 'secondary subscriptions' for topic2 and topic3. The subscription manager 200 is the identified subscriber for these secondary subscriptions, and so messages received on these topics are passed to the subscription manager 200 by the matching engine 70'.

Referring to sequence 3, the first publisher PUBLISHER1 sends another message on topic1 to the message broker. The subscription manager 200 checks for any active subscriptions—scanning the subscription list 80' for any subscriptions with a status flag set to active. Since the newly registered subscription is inactive, the only active subscriptions identified by the subscription manager are the secondary subscriptions on topic2 and topic3. Since there is no topic match, the published message on topic1 is deleted.

Referring to sequence 4, a second publisher PUBLISHER2 sends a message on topic2. As in sequences 1 and 2, the subscription manager checks for active subscriptions. On this occasion, the secondary subscriptions on topic2 and topic3 are identified as active and the subscription matching engine 70' is invoked to compare the topic of the received message (topic2) with the topic of each of the active subscriptions (topic2 and topic3 respectively). This comparison identifies a topic match for topic2 and identifies the subscription manager 200 as the target recipient of the new message. In this embodiment, all messages for which the subscription manager 200 is a target recipient are activation/deactivation events. However, it is generally possible for a single message to be forwarded to conventional subscribers as well as to the subscription manager.

The message on topic2 is passed to the subscription manager 200, which identifies the message as an activation event for the primary subscription. The subscription manager changes the status flag associated with the primary subscription to 'active'. So we now have an active primary subscription on topic1. The message on topic2 may also be forwarded to a set of subscribers that are identified by the matching engine.

Sequence 5 is performed after activation of the primary subscription. The first publisher PUBLISHER1 sends another message on topics. As before, the subscription manager 200 checks for active subscriptions and, on this occasion identifies three active subscriptions (the primary subscription and the secondary subscriptions). The subscription matching engine 70' is invoked to compare the newly received message with the topics within these active subscriptions, and a topic match is identified with the primary subscription on topic1. Any additional filters within the subscription are applied by the matching engine 70' and, if the published message satisfies the filter conditions, the message is forwarded to the subscriber SUBSCRIBER1. SUBSCRIBER1 can then process the message as in conventional systems.

Meanwhile, the primary subscription remains active until a deactivation event occurs. The deactivation event may be receipt, at some future time, of a message on topic3 from PUBLISHER2 or from a different publisher. The set of primary and secondary subscriptions remain under the management of the publish/subscribe broker until an unsubscribe command is received from the subscriber or, in the case of non-durable subscriptions, until the subscriber disconnects from the broker (if disconnection is before an explicit unsubscribe).

Figure 4A:
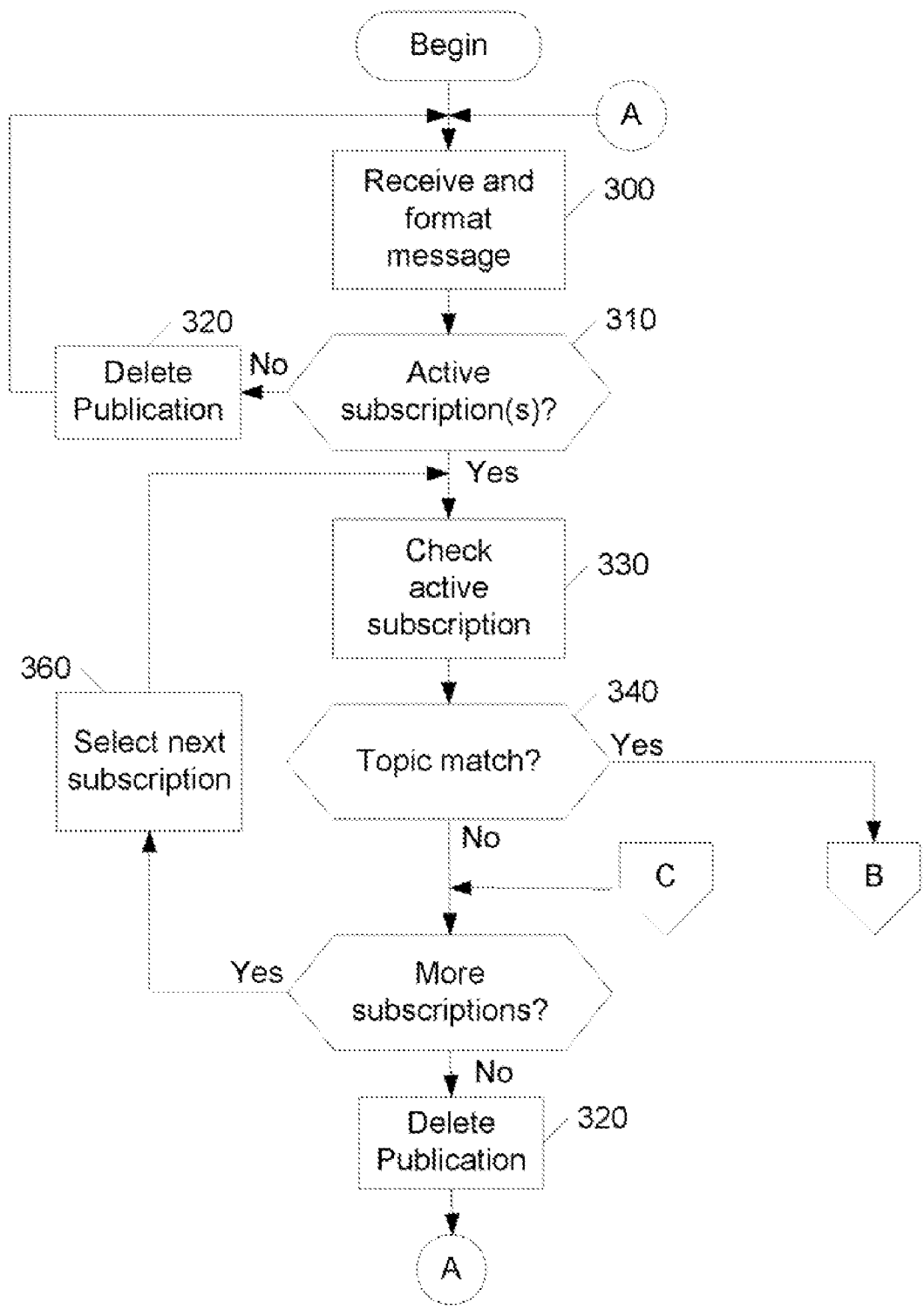
FIG. 4, consisting of FIGS. 4A and 4B taken together, is a schematic flow diagram showing the steps of a method, as implemented at a publish/subscribe broker, for managing subscriptions and performing subscription matching according to an embodiment of the invention.
Figure 4B:
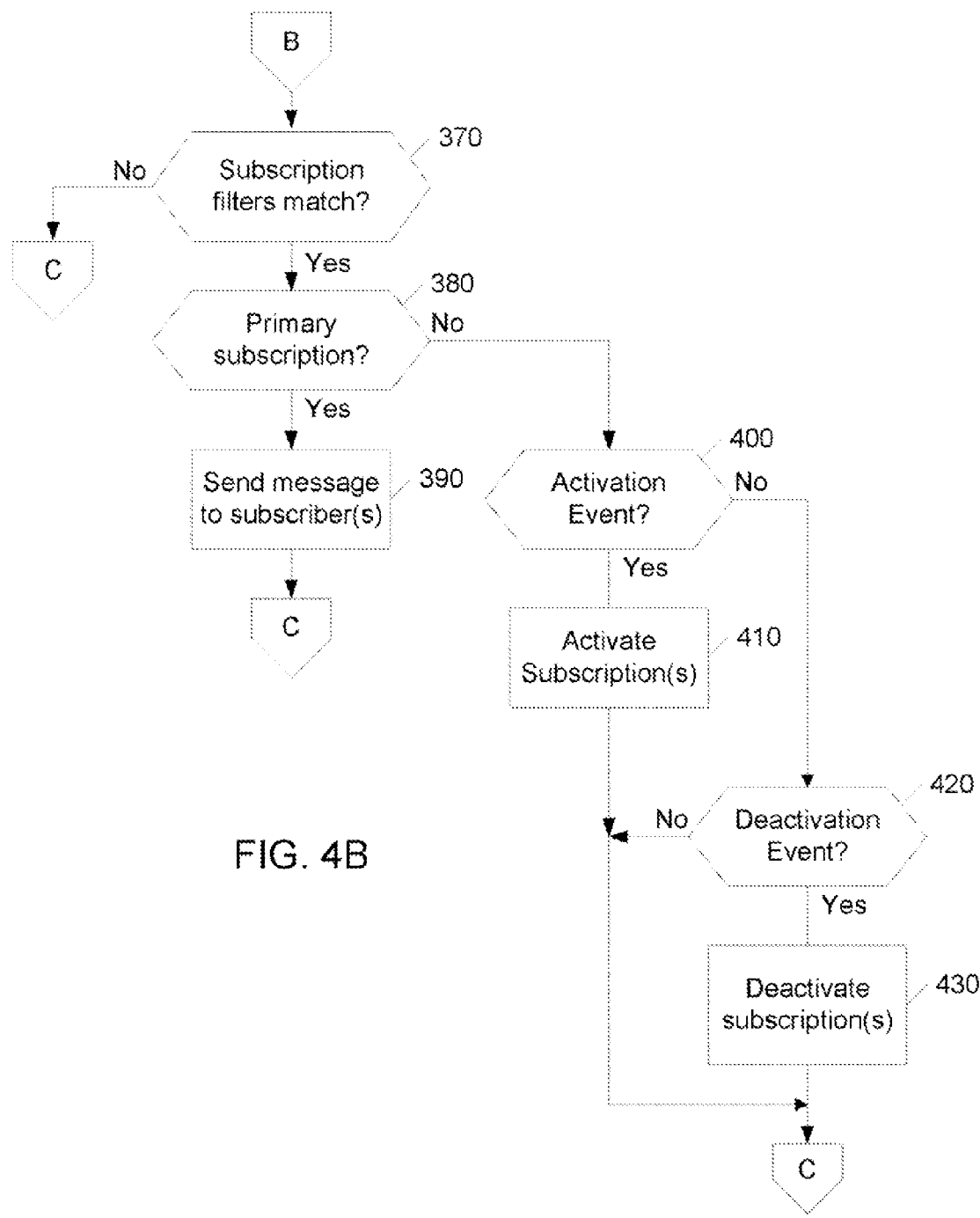

The method steps performed by a publish/subscribe broker in response to receipt of a new message are represented in the flow diagram of FIG. 4—including operations to implement the above-described sequences 1, 3, 4 and 5. The broker receives 300 a new published message and transforms the message from a byte stream format to a canonical form that can be processed by the broker. The broker checks 310 its subscription list to determine whether any subscriptions are currently active (that is, any primary subscriptions of registered subscribers or any secondary subscriptions of the subscription manager 200). If there are no active subscriptions, the message is deleted 320 and the broker's processing ends for the current message. If there is at least one active subscription, the broker's subscription matching engine accesses 330 a first active subscription and compares 340 the subscription's topic string with the published message's topic string. If there is no topic match, a check is performed 350 of whether there are any additional active subscriptions and, if so, the next active subscription is accessed 360.

If a topic match is identified 340, any filters defined within the subscription are next compared 370 with the published message. If the filter is not satisfied, a check is performed 350 of whether there are any additional active subscriptions. If, however, a topic match is identified, a check is performed 380 of whether the matching subscription is a primary subscription for which there are one or more registered subscribers. If this check identifies one or more primary subscribers (i.e. a conventional subscriber rather than the subscription manager), the message is sent 390 by the broker to the identified subscribers.

If, however, the matched topic is for a secondary subscription, a check is performed 400 of whether the published message is an activation event (i.e. an activation event condition has been satisfied for a primary subscription or set of primary subscriptions). If so, the subscription manager activates 410 the respective primary subscription(s). If the published message is not an activation event, a further check 420 is made to determine whether it is a deactivation event. If so, respective primary subscription or subscriptions are deactivated 430.

It will be understood by persons skilled in the art that various modifications may be made to the above-described embodiments within the scope of the present invention. For example, the embodiment described in detail above includes messages on various topics being used as activation events and deactivation events, switching subscription matching on or off for a registered subscription. For example, the respective activation and deactivation events could be messages published on different topics or a single topic may be used for both activation and deactivation events.

Other activation/deactivation events that are within the scope of the present invention include location-based events such as arrival at a new location, which may trigger activation of a subscription to news or entertainment information that is relevant to the location. Many other applications can use the same feature. For example, an engineer may have subscriptions activated for sensor information relating to the engineer's current location as he/she inspects an engineering installation, while subscription matching for other locations is deactivated. Alternatively, a subscription may be activated in response to determining that a communications medium or destination device is available, with subscriptions being switched off at other times to avoid the number of messages held in system storage building up.

One embodiment described in detail above refers to a status flag being set within the subscription list to indicate whether a subscription is in an active or inactive state. The step of setting active/inactive flags on each subscription involves little processing overhead; but the flags have to be checked when processing each new message. Alternative implementations of the invention may maintain two separate lists of subscriptions—one active and one inactive—or may maintain an index of currently active subscriptions, instead of using the status flag. This implementation may require subscriptions to be moved between the lists, but has the advantage that the entire inactive list can be disregarded when processing a new message.

In one embodiment described above, activation/deactivation events are handled by a subscription manager using secondary subscriptions, such that the events control a primary subscription. In an alternative embodiment, the secondary subscriptions may themselves be activated and deactivated, so that the subscription manager monitors either activation events or deactivation events for a particular primary subscription at any one time, but not both (i.e. there is no need to monitor for activation events for a subscription that is already active; and no need to monitor for deactivation events for an inactive subscription). This is implemented by the subscription manager 200 responding to identification of an activation event by setting the 'deactivation' secondary subscription (on topic3) to active and setting the 'activation' secondary subscription (on topic2) to inactive. The subscription manager responds to a deactivation event by setting the topic3 secondary subscription to inactive and setting the topic2 secondary subscription to active.

In another embodiment, the subscription manager is responsive to trigger events that are not implemented using secondary subscriptions. For example, a security or emergency alert may be implemented by a mechanism other than publish/subscribe communications and yet can be used to control activation of one or more subscriptions.

Another embodiment of the invention implements a feature referred to briefly above. This is the 'retain' feature that involves a publish/subscribe broker saving the last received message on a topic to enable new subscribers to gain fast access to the latest message. In typical implementation of retained messages, the broker implements rules for what to retain and when to expire a retained message, possibly in response to publishers setting a retain flag. The present invention introduces registered but inactive subscriptions, which complements the feature of retained messages.

An inactive subscriber may wish the last message (or last N messages) on a topic to be held at the broker and to be forwarded to the subscriber upon activation of the subscription. Let us assume that a subscriber has registered a subscription on topic1 with an activate clause on topic2. The activate clause is compared with the topic string within a received message to determine whether there is a match. If there is a topic match on topic2 (and filters are satisfied), the subscription is activated. If any messages on topic1 have been retained, the subscription manager can initiate a comparison between the subscription and retained messages to achieve fast delivery of the latest message(s) on topic1 to the relevant subscribers. In addition, a deactivate clause may be specified. If the deactivate clause matches, the primary subscription will not be matched against retained messages. In a further extension of this embodiment, the broker can take account of retain requirements specified within inactive subscriptions (for example, retaining N messages on a topic where N is the highest number specified by any subscriber to that topic, or any of the subset of subscribers that are currently inactive).

An alternative embodiment of the invention uses a retained messages mechanism for a modified purpose. In this embodiment, activate and deactivate topics are retained, such that the broker always has access to the last state of each subscription. The broker can then check an activate/deactivate clause whenever a message is matched. As is known in the art, a broker can retain the last message published on a topic. This is typically used to provide a new subscriber the last known value of the topic. In the present embodiment, the subscriber registers a subscription as normal, but with an optional "is active" clause. The optional "is active" clause can refer to a different topic than the primary topic that the subscription is based on.

When the subscription is evaluated to see if it matches a published message, the "is active" clause is evaluated using the retained message (if any) which has been previously stored on the "is active" topic. If it matches, the published message is sent to the subscriber. In addition, an "is not active" clause could be specified—if this clause matches any retained message then the primary subscription will not be matched.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A method of managing subscription matching within a publish/subscribe communications network, comprising:
   storing, in a memory, a subscription at a publish/subscribe broker for a first subscriber, wherein the subscription comprises at least one temporally unpredictable event for controlling the performance of subscription matching;
   monitoring, with a processor, events at the publish/subscribe broker to detect said event; and
   altering the state of subscription matching performed on behalf of the first subscriber in response to detection of said event.

2. The method according to claim 1 wherein the subscription defines a first topic to compare with received messages during subscription matching, and wherein the defined event is the event of receiving a message at the publish/subscribe broker, which message includes a predefined topic that differs from the first topic.

3. The method according to claim 2, further comprising checking, using said processor, whether the received message satisfies a set of one or more filter conditions associated with the predefined topic, wherein the state of subscription matching is altered in responsive to a positive determination that the received message satisfies the set of filter conditions.

4. The method according to claim 3, further comprising storing, in said memory, subscriptions on behalf of multiple subscribers, which subscriptions define a common event, and the state of subscription matching is altered on behalf of said multiple subscribers in response to the common event.

5. The method according to claim 4 wherein said event is an activation event and subscription matching is activated in response to detection of the activation event.

6. The method according to claim 5 wherein said event is a deactivation event and subscription matching is deactivated in response to detection of said deactivation event.

7. A data processing apparatus for managing subscription matching within a publish/subscribe communications network, comprising:
   a processor; and
   memory connected to the processor, wherein the memory is encoded with instructions and wherein the instructions when executed comprise:
   instructions for storing a subscription in a repository on behalf of at least one subscriber, wherein the subscription comprises at least one temporally unpredictable event for controlling the performance of subscription matching;
   instructions for subscription matching a publish/subscribe broker comprising a matching engine;
   instructions for detecting with an event monitor an occurrence of said event at the publish/subscribe broker; and
   instructions for responding with said publish/subscribe broker to detection of said event to alter the state of subscription matching performed on behalf of the at least one subscriber.

8. The data processing apparatus according to claim 7 wherein the subscription defines a first topic to compare with received messages during subscription matching, and wherein the defined event is the event of receiving a message at the publish/subscribe broker, which message includes a predefined topic that differs from the first topic.

9. The data processing apparatus according to claim 8, further comprising instructions for checking with filtering logic whether the received message satisfies a set of one or more filter conditions associated with the predefined topic, wherein the state of subscription matching is altered in responsive to a positive determination that the received message satisfies the set of filter conditions.

10. The data processing apparatus according to claim 9, further comprising instructions for storing subscriptions with control logic on behalf of multiple subscribers, which subscriptions define a common event, and wherein the state of subscription matching on behalf is altered on behalf of said multiple subscribers in response to occurrence of the common event.

11. A computer program product for managing subscription matching within a publish/subscribe communications network, the computer program product comprising a computer usable readable storage medium having computer readable program code embodied therewith, the computer readable program code comprising:
   computer readable program code configured to store a subscription at a publish/subscribe broker for a first subscriber, wherein the subscription comprises at least one temporally unpredictable event for controlling the performance of subscription matching;
   computer readable program code configured to monitor events at the publish/subscribe broker to detect an occurrence of said event; and
   computer readable program code configured to alter the state of subscription matching performed on behalf of the first subscriber in response to detection of said event.

12. The computer program product program according to claim 11 wherein the subscription defines a first topic to compare with received messages during subscription matching, and wherein the defined event is the event of receiving a message at the publish/subscribe broker, which message includes a predefined topic that differs from the first topic.

13. The computer program product according to claim 12 further comprising computer readable program code configured to check whether the received message satisfies a set of one or more filter conditions associated with the predefined topic, wherein the state of subscription matching is altered in responsive to a positive determination that the received message satisfies the set of filter conditions.

14. The computer program product according to claim 13 further comprising:
   computer readable program code configured to store subscriptions on behalf of multiple subscribers, which subscriptions define a common event; and
   computer readable program code configured to alter the state of subscription matching performed on behalf of said multiple subscribers in response to detection of the common event.

15. The computer program product according to claim 14 wherein said event is an activation event and subscription matching is activated in response to occurrence of said activation event.

16. The computer program product according to claim 14 wherein said event is a deactivation event and subscription matching is deactivated in response to occurrence of said deactivation event.

\* \* \* \* \*